United States Patent
Ochiai et al.

(10) Patent No.: US 9,702,183 B1
(45) Date of Patent: Jul. 11, 2017

(54) SMART SUNSHADE FOR A VEHICLE WINDOW

(71) Applicant: Toyota Motor Engineering & Manufacturing North America, Inc., Erlanger, KY (US)

(72) Inventors: Yuichi Ochiai, Cupertino, CA (US); Katsumi Nagata, Foster City, CA (US); Akira Sasaki, San Jose, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/055,364

(22) Filed: Feb. 26, 2016

(51) Int. Cl.
| | | |
|---|---|---|
| *B60J 3/00* | (2006.01) | |
| *E06B 9/24* | (2006.01) | |
| *G02F 1/137* | (2006.01) | |
| *G06K 9/00* | (2006.01) | |

(52) U.S. Cl.
CPC ............... *E06B 9/24* (2013.01); *G02F 1/137* (2013.01); *G06K 9/00845* (2013.01); *E06B 2009/2405* (2013.01); *E06B 2009/2464* (2013.01); *G02F 2001/13756* (2013.01); *G06K 9/00604* (2013.01)

(58) Field of Classification Search
CPC ............... E06B 9/24; E06B 2009/2405; E06B 2009/2464; G02F 1/137; G02F 2001/13756; G06K 9/00845; G06K 9/00604
See application file for complete search history.

(56) References Cited

U.S. PATENT DOCUMENTS

| | | |
|---|---|---|
| 4,641,922 A | 2/1987 | Jacob |
| 5,298,732 A | 3/1994 | Chen |
| 5,645,758 A | 7/1997 | Kawasumi et al. |
| 6,580,472 B1 | 6/2003 | Willingham et al. |
| 6,666,493 B1 | 12/2003 | Naik |
| 6,872,901 B2 | 3/2005 | Su et al. |
| 6,997,501 B2 | 2/2006 | Conforti |
| 7,413,233 B1 | 8/2008 | Jung |
| 7,970,172 B1 | 6/2011 | Hendrickson |

(Continued)

FOREIGN PATENT DOCUMENTS

| | | |
|---|---|---|
| CN | 101923237 | 12/2010 |
| DE | 19814094 | 10/1999 |

OTHER PUBLICATIONS

Wheeler, Michael D.; "HUD Systems: Augmented Reality Is Coming to Your Windshield"; Photonics Spectra; pp. 34-37; Feb. 2016.

*Primary Examiner* — Lori L Lyjak
(74) *Attorney, Agent, or Firm* — Snell & Wilmer LLP

(57) ABSTRACT

A system for reducing sunlight shining into a vehicle includes a window having an array of liquid crystals switchable between a transparent state and a shaded state. The system also includes an eye position sensor for detecting a location of eyes of a driver and an inertial measurement unit (IMU) for detecting a current heading of the vehicle. The system also includes an electronic control unit (ECU) that may determine a current location of the sun relative to the vehicle based on the current heading of the vehicle and a current time of day. The ECU may also select an area of the window to be shaded in order to reduce an amount of sunlight reaching the eyes of the driver and control liquid crystals within the selected area of the window to switch from the transparent state to the shaded state.

20 Claims, 12 Drawing Sheets

(56) References Cited

U.S. PATENT DOCUMENTS

| | | | | |
|---|---|---|---|---|
| 9,415,745 B1* | 8/2016 | Clemen, Jr. | ............. | B60R 22/00 |
| 2005/0068629 A1* | 3/2005 | Fernando | .......... | B32B 17/10036 |
| | | | | 359/609 |
| 2009/0116098 A1 | 5/2009 | Chang | | |
| 2009/0295681 A1 | 12/2009 | Kaminski et al. | | |
| 2010/0244495 A1 | 9/2010 | Lawall et al. | | |
| 2015/0092083 A1 | 4/2015 | Lam | | |
| 2016/0097236 A1* | 4/2016 | Ko | ........................... | E06B 9/24 |
| | | | | 349/16 |

\* cited by examiner

200

| TIME OF DAY | SUN LOCATION | |
|---|---|---|
| | DIRECTION | VERTICAL POSITION RELATIVE TO HORIZON |
| 12:00 | 160 DEGREES | 65 DEGREES |
| 12:10 | 158 DEGREES | 64 DEGREES |
| 12:15 | 156 DEGREES | 63 DEGREES |
| 12:20 | 154 DEGREES | 62 DEGREES |
| 12:25 | 152 DEGREES | 61 DEGREES |
| 12:30 | 150 DEGREES | 60 DEGREES |
| 12:35 | 148 DEGREES | 59 DEGREES |
| 12:40 | 146 DEGREES | 58 DEGREES |
| 12:45 | 144 DEGREES | 57 DEGREES |
| 12:50 | 142 DEGREES | 56 DEGREES |
| 12:55 | 140 DEGREES | 55 DEGREES |
| 1:00 | 138 DEGREES | 54 DEGREES |

FIG. 2

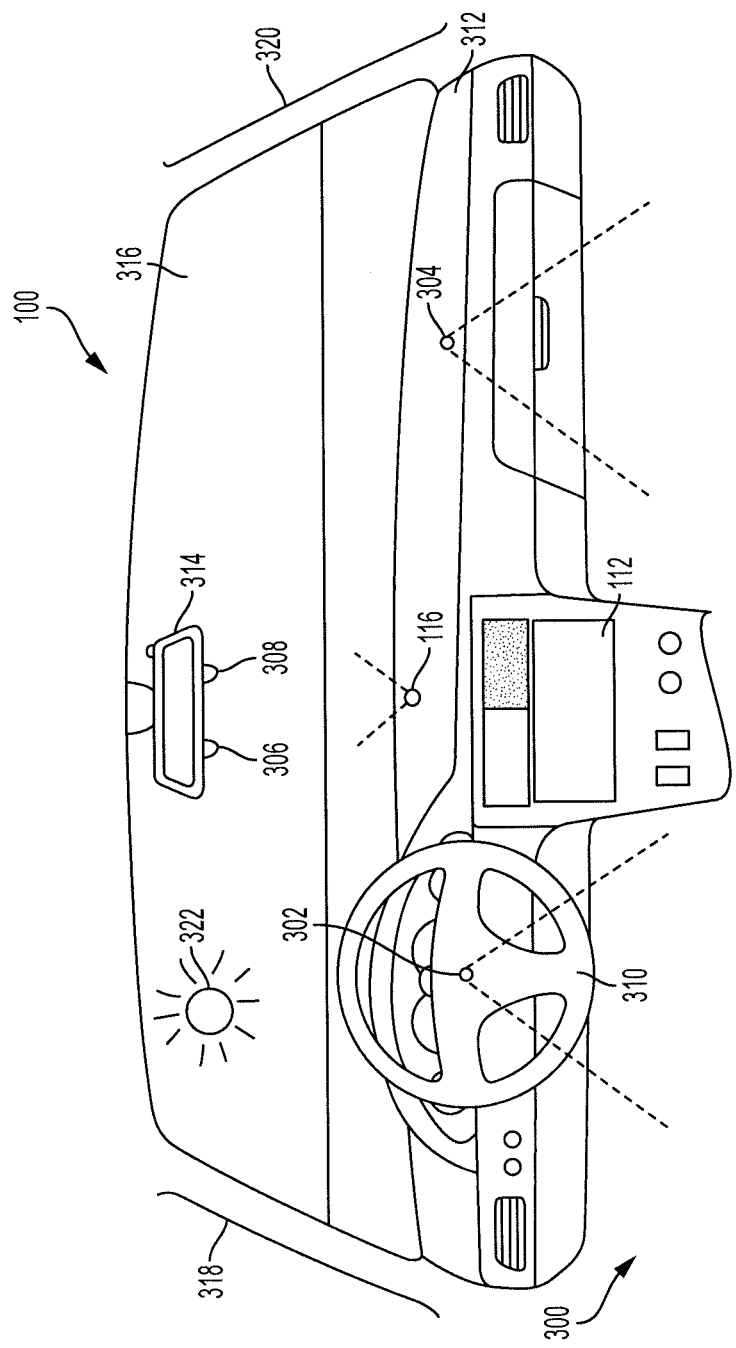

SMART SUNSHADE FOR A VEHICLE WINDOW

BACKGROUND

Field

The present disclosure relates to systems and methods for automatic shading of a portion of a vehicle window and, more particularly, for determining where to shade the window to prevent, or reduce an amount of, sunlight from reaching the eyes of the driver and for controlling liquid crystals of the window to provide the shade.

Description of the Related Art

Most conventional vehicles include a sun visor for a driver and a sun visor for a passenger. These sun visors are attached to an interior of the vehicle cabin above the windshield. A typical sun visor can rotate to a position in which it covers a portion of the windshield or a driver or passenger window. Conventional sun visors have a length of approximately 6 inches that may cover a portion of a windshield or window, such as the top one third to one quarter of the windshield, when fully extended. Conventional sun visors are opaque and have no transparency.

In some locations, such as on flat areas of land in the western United States, the shade afforded by sun visors may provide insufficient shade or blocking of the sun. This may be especially true for a period of time after dawn and before dusk. During these times direct sunlight can shine through the windshield at a location below the reach of the sun visors and shine in the driver's and front passenger's eyes. This direct sunlight is not only unpleasant and hazardous to the health of the driver and passenger (as it can cause eye damage) but it also creates dangerous driving conditions. For example, a driver may not be capable of seeing the current conditions of the road if the sun is shining directly into his or her eyes.

Thus, there is a need for systems and methods for providing shade on a vehicle window to reduce an amount of direct sunlight shining into a driver's or passenger's eyes.

SUMMARY

Described herein is a system for reducing sunlight shining into a vehicle. The system includes a window having an array of liquid crystals that can each be switched between a transparent state and a shaded state. Less light may pass through the liquid crystals when they are in the shaded state than when they are in the transparent state. The system also includes an eye position sensor for detecting a location of the eyes of a driver. The system also includes an inertial measurement unit (IMU) for detecting a current heading of the vehicle. The system also includes an electronic control unit (ECU) coupled to the array of liquid crystals, the eye position sensor and the IMU. The ECU may determine a current location of the sun relative to the vehicle based on the current heading of the vehicle and a current time of day. The ECU may also select an area of the window to be shaded in order to reduce an amount of sunlight reaching the eyes of the driver based on the location of the eyes of the driver and the current location of the sun relative to the vehicle. The ECU may also control liquid crystals within the selected area of the window to switch from the transparent state to the shaded state.

Also described is a system for reducing sunlight shining into a vehicle. The vehicle includes a window having an array of liquid crystals that can each be switched between a transparent state and a shaded state in which less light can pass therethrough. The system also includes a driver-facing camera configured to detect a current location of exposed skin of a driver. The system also includes a sun position sensor configured to detect a current location of the sun relative to the vehicle. The vehicle also includes an ECU coupled to the array of liquid crystals, the driver-facing camera and the sun position sensor. The ECU may select at least one area of the window to be shaded in order to reduce an amount of sunlight reaching the exposed skin of the driver based on the current location of the exposed skin and the detected current location of the sun relative to the vehicle. The ECU may also control liquid crystals within the at least one selected area of the window to switch from the transparent state to the shaded state.

Also described is a method for reducing sunlight shining into a vehicle. The method includes detecting, by an eye position sensor, a location of the eyes of a driver. The method also includes detecting, by an IMU, a current heading of the vehicle. The method also includes determining, by an ECU, a current location of the sun relative to the vehicle based on the current heading of the vehicle and a current time of day. The method also includes selecting, by the ECU, an area of a window of the vehicle to be shaded in order to reduce an amount of sunlight reaching the eyes of the driver based on the location of the eyes of the driver and the current location of the sun relative to the vehicle. The method also includes controlling, by the ECU, liquid crystals within the selected area of the window to switch from a transparent state to a shaded state in which less light can pass therethrough.

BRIEF DESCRIPTION OF THE DRAWINGS

The features, obstacles, and advantages of the present invention will become more apparent from the detailed description set forth below when taken in conjunction with the drawings, wherein:

FIG. 2 is an exemplary portion of a sun movement chart showing various positions of the sun in the sky based on a time of day according to an embodiment of the present invention;

FIG. 3 is a drawing of a cabin of the vehicle of FIG. 1 with a windshield having liquid crystals and various sensors for detecting data corresponding to the location of the sun and the eyes of the driver according to an embodiment of the present invention;

DETAILED DESCRIPTION

Described herein are systems and methods for providing shade to a driver or a passenger of a vehicle using liquid crystals of a window. The systems and methods provide several benefits and advantages such as providing shade between the driver's eyes and the sun without any actions required by the driver. The systems and methods provide further benefits and advantages such as the ability to verify whether the shaded area of the window is actually providing shade where desired and the ability to periodically or continuously move the shaded area of the windshield to realign the shade between the driver's eyes and the sun. This provides benefits and advantages such as increased driver comfort because direct sunlight will not be shining in his or her eyes and increased personal and vehicular safety for the same reasons. The systems and methods provide further benefits and advantages such as the ability for the driver to see the road and/or environment through the shaded area of the window, further increasing vehicular safety.

An exemplary system includes at least one window having liquid crystals. The system also includes an eye position sensor for detecting the current location of the driver's eyes and an inertial measurement unit (IMU) for detecting a current heading and pitch of the vehicle. The system also includes an electronic control unit (ECU). The ECU can determine a current location of the sun relative to the vehicle based on the current heading of the vehicle and a current time of day. For example, the ECU may compare the current time of day to a sun movement chart to determine a location of the sun in the sky and may compare the heading and pitch of the vehicle to the location of the sun in the sky. The ECU may also select an area of the windshield that is directly between the driver's eyes and the sun based on the detected location of the driver's eyes and determined location of the sun. The ECU may control liquid crystals within the area to switch to a shaded state to reduce an amount of sunlight that reaches the driver's eyes.

Figure 1:
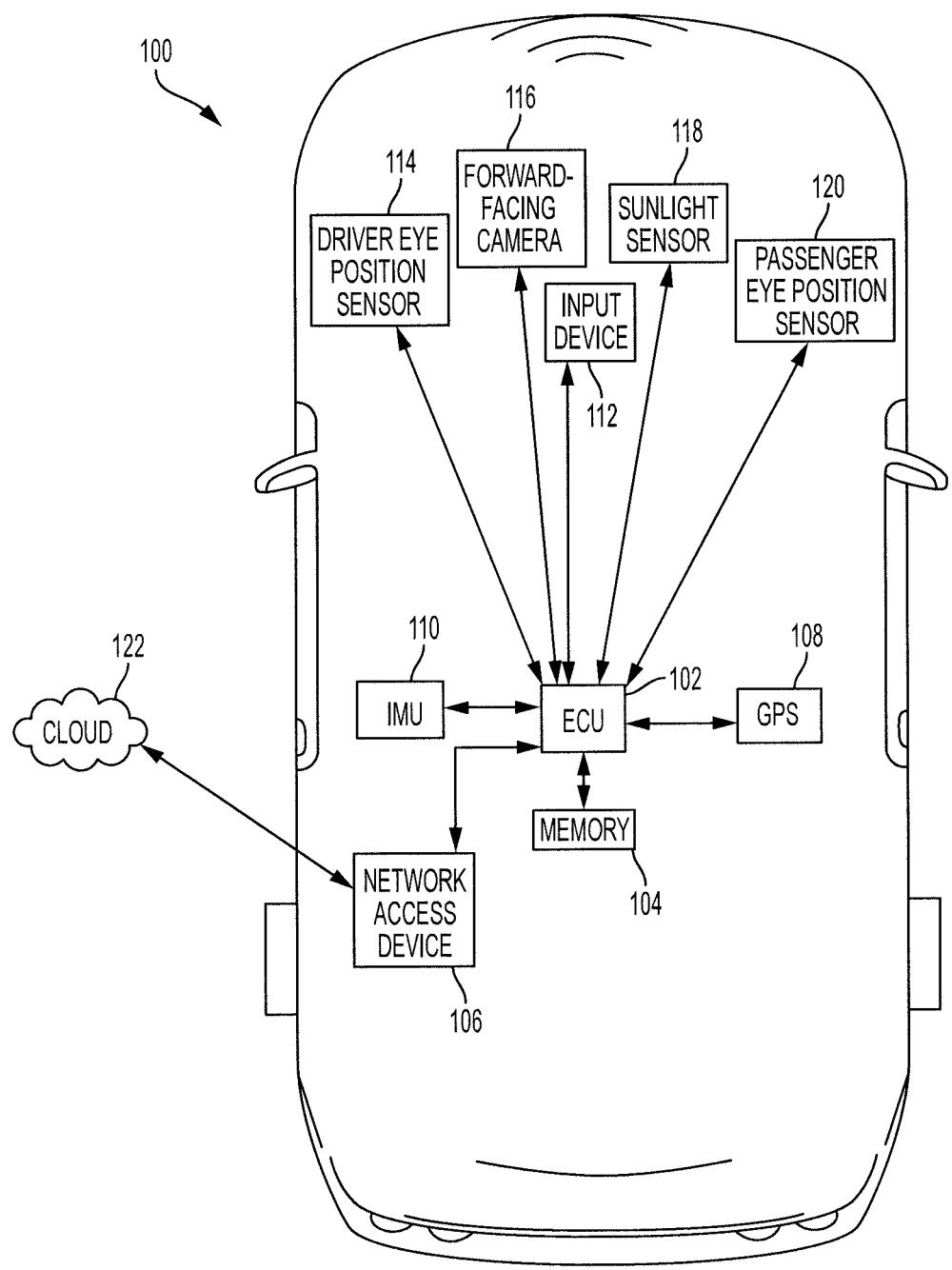
FIG. 1 is a block diagram of a vehicle having a window with liquid crystals for providing shade between a driver's eyes and the sun according to an embodiment of the present invention.

Turning to FIG. 1, a vehicle 100 includes features for shading windows to reduce an amount of sunlight from reaching a driver's eyes. The vehicle 100 may include an ECU 102, a memory 104, a network access device 106, a global positioning system (GPS) unit 108, an IMU 110 and an input device 112. The vehicle 100 may also include multiple sensors such as a driver eye position sensor 114, a forward-facing camera 116, a sunlight sensor 118 and a passenger eye position sensor 120.

The ECU 102 can include one or more processors or controllers which may be specifically designed for automotive systems. The functions of the ECU 102 can be implemented in a single ECU or in multiple ECUs. The ECU 102 may receive data from components of the vehicle 100, may make determinations based on the received data and may control the operation of components based on the determinations and received data.

The memory 104 may include any non-transitory memory known in the art. The memory 104 may store machine-readable instructions usable by the ECU 102 and may store any other data as requested by the ECU 102.

In some embodiments the memory may store a sun location chart. The sun location chart may include data such as locations of the sun in the sky for various dates, times of day and locations. For example, the sun location chart may provide the direction and vertical position of the sun for a given location, date and time of day.

Referring briefly to FIG. 2, an exemplary sun location chart 200 provides the direction and vertical position of the sun relative to the horizon for a particular location, date and time of day. For example, the sun location chart 200 shown in FIG. 2 may provide sun location data for zip code 92626 on Feb. 10, 2016 between 12 o'clock pm (12 pm) and 1 pm. The sun location chart may include data based on the current location and direction of travel of the vehicle and the particular date and time of day. A sun location chart may include data similar to the data shown in FIG. 2 and/or may include data for multiple locations, multiple dates and more times of day. For example, a sun location chart may be provided having sun location data corresponding to each day of the year and each time of day for each location in the United States.

The direction provided in the sun location data corresponds to a direction along the North, South, East and West axes. For example, at 12:00 pm the direction of the sun is 160 degrees which corresponds to a South-Southeast direction. The vertical position relative to the horizon corresponds to how high the sun is above the horizon. For example, at 12:00 pm, the vertical position of the sun is 65 degrees, which indicates that the sun is positioned 65 degrees above the horizon.

Returning to FIG. 1, the network access device 106 may include any device capable of communicating with an external device or network. For example, the network access device 106 may communicate with the cloud 122 via 3G protocols, 4G protocols, 802.11 (Wi-Fi) protocols or the like.

In some embodiments the network access device 106 may also or instead include an input/output (I/O) port. In that regard, the network access device 106 may connect to other devices via a wired or wireless interface. For example, the network access device 106 may be a USB port, a Wi-Fi port, a Bluetooth port, a Dedicated Short-Range Communications (DSRC, usable in vehicle-to-infrastructure or vehicle-to-vehicle communications) port or the like. The network access device 106 may transmit data to and receive data from an external device such as a mobile phone (not shown) or telematics device which may in turn communicate with the cloud 122 or other vehicles (not shown). In that regard, the ECU 102 can communicate with the cloud 122 via the network access device 106 and the mobile phone.

In some embodiments the cloud 122 may include a sun location map. In that regard, the ECU 102 may transmit a current location, time of day and/or date to the cloud 122 and may receive sun location data corresponding to a direction and vertical position of the sun from the cloud 122 in response.

The GPS unit 108 may include one or more GPS receivers capable of receiving location data corresponding to a current location of the vehicle 100. In that regard, the ECU 102 can determine a current location of the vehicle 100 based on data from the GPS unit 108.

The IMU 110 may include any sensor or sensors capable of detecting inertial movement of the vehicle 100. For example, the IMU 110 may include a gyroscope, an accelerometer, a magnetometer or the like. The IMU 110 may detect data corresponding to an acceleration of the vehicle 100 in one or more directions. For example, the IMU 110 may be a 2 or 3 axis accelerometer capable of detecting acceleration along 2 or 3 axes. The IMU 110 may detect data corresponding to a heading of the vehicle 100 (i.e., in the North, South, East and/or West directions) along with a pitch of the vehicle 100 relative to the horizon (i.e., an angle of the vehicle relative to the horizon).

The input device 112 may include any input device capable of receiving user input. For example, the input device 112 may include a button, a knob, a dial, a touchscreen, a touchpad, a microphone or the like. The input device 112 may be coupled to the ECU 102 such that the ECU 102 can receive user input. The input device 112 may receive user input indicating, for example, whether the user would like for an automatic sunshade feature of the vehicle 100 to be turned on or off.

The driver eye position sensor 114 may include any sensor capable of detecting data corresponding to a location of the eyes of the driver. For example, the driver eye position sensor 114 may include a driver-facing camera that detects image data corresponding to an area of a cabin of the vehicle 100 in which a driver's head is likely to be positioned. The ECU 102 can receive the image data and determine the location of the driver's eyes within the vehicle 100 based on the received image data.

In some embodiments, the driver eye position sensor 114 may include more than one driver-facing camera or other driver eye position sensor. In some embodiments, the one or more driver eye position sensor 114 may detect data corresponding to a larger portion of the driver such as the driver's head. The ECU 102 may determine a location of the whole head of the driver based on the detected data from the driver eye position sensor 114. In some embodiments, the ECU 102 may determine a size of the driver's head or face and determine the location of the entire head or face of the driver based on the size of the driver's head and the determined location of the driver's eyes.

In some embodiments, the driver eye position sensor 114 may detect data corresponding to the entire body of the driver. The ECU 102 may use this data to determine the location of the driver's entire body. The ECU 102 can differentiate the detected colors or tones and determine locations in which the driver's skin is exposed to sunlight.

The driver eye position sensor 114 may also or instead be a pressure sensor positioned in a headrest of a driver seat of the vehicle 100. In that regard, the ECU 102 may determine or estimate a location of a driver's head based on the detected pressure in the headrest. The ECU 102 may also estimate the location of the driver's eyes based on the location of the driver's head and the detected pressure. For example, the pressure sensor may detect the most pressure in the middle of the headrest, indicating that the center of the driver's head is in the middle of the headrest. The pressure sensor may also detect more pressure to the left of the middle than to the right of the middle, indicating that the driver is looking left and thus his eyes will be left of the middle of his head.

The forward-facing camera 116 may detect data corresponding to an area outside of the vehicle 100. For example, the forward-facing camera 116 may detect data in front of the vehicle 100, to either side of the vehicle 100 and/or behind the vehicle 100. In that regard, the forward-facing camera 116 may include multiple cameras positioned about the vehicle 100.

The forward-facing camera 116 may detect a location of the sun. Because the forward-facing camera 116 is facing a fixed direction relative to the vehicle 100, the ECU 102 may use the detected location of the sun to determine the location of the sun relative to the vehicle. For example, the ECU 102 may determine that the sun is directly ahead and 45 degrees above a current heading and pitch of the vehicle 100 based on the image data detected by the forward-facing camera 116.

The sunlight sensor 118 may include any sensor capable of determining whether the sun is shining (such as whether it is nighttime, whether the sun is behind clouds or the like) and/or determining whether sunlight is reaching the interior of the vehicle's cabin.

The passenger eye position sensor 120 may include similar features as the driver eye position sensor 114.

Turning now to FIGS. 1 and 3, a view of a cabin 300 of the vehicle 100 is shown. The driver eye position sensor 114 includes a driver-facing camera 302 and the passenger eye position sensor 120 includes a passenger-facing camera 304. Furthermore, the sunlight sensor 118 includes a driver-side sunlight sensor 306 and a passenger-side sunlight sensor 308. The driver-side sunlight sensor 306 may detect whether sunlight is shining into the driver side of the cabin 300 and the passenger-side sunlight sensor 308 may determine whether sunlight is shining into the passenger side of the cabin 300.

The driver-facing camera 302 may be positioned on a steering wheel 310 or elsewhere in the cabin 300. The driver-facing camera 302 should be at a position in which it can detect the location of the driver's eyes at most or all reasonable driver positions. For example, the driver-facing camera 302 should be able to detect the location of the driver's eyes when the driver leans or turns his head to the left or right.

The passenger-facing camera 304 may be positioned on a dashboard 312 or elsewhere in the cabin. Like the driver-facing camera 302, the passenger-facing camera 304 should be able to detect the location of the passenger's eyes when the passenger leans or turns his head left or right.

The driver-side sunlight sensor 306 and the passenger-side sunlight sensor 308 may be positioned on a rear-view mirror 314 or elsewhere in the cabin. The driver-side sunlight sensor 306 should be positioned such that it can detect whether sunlight is entering the driver side of the cabin. The passenger-side sunlight sensor 308 should be positioned such that it can detect whether sunlight is entering the passenger side of the cabin.

The vehicle 100 includes multiple windows including a windshield 316, a driver window 318 and a passenger window 320. The vehicle 100 may also include a rear window (not shown) and may potentially include additional windows corresponding to a back seat.

One or more of the windows of the vehicle 100 may include an array of liquid crystals or other material or technology that can be electronically controlled to switch states between a transparent state (in which all light may pass therethrough) and a shaded state (in which some or no light may pass therethrough). The shaded state provided a value or a range of tinting, blocking and/or filtering of the sun's rays. For example, the tinting can be 25 percent blocking of the sun light. Also, for example, the range can be between 10 percent tint to 50 percent tint. The shaded state may provide protection against harmful or damaging rays such as ultraviolet (UV) rays. The shaded state may include polarization similar to a polarizing filter or a polarizing glass.

The ECU 102 may be coupled to the array of liquid crystals and may control the liquid crystals individually to cause some of them to be in the transparent state and some of them to be in the shaded state. In some embodiments, the liquid crystals may be positioned on an entire window or only a portion of the window. For example, liquid crystals may be positioned on the top two thirds of the windshield 316 but not on the bottom third or not positioned on the extreme left and right edges of the windshield 316. In one embodiment, the liquid crystals may include tinting and/or polarization to protect against harmful or damaging rays such as ultraviolet (UV) rays.

The ECU 102 may compare a detected location, date and time of day to the sun movement chart in the memory 104 to determine a current location of the sun 322. Alternatively, the ECU 102 may provide some of this memory to a remote device in the cloud 122 and receive sun location data in return. The ECU 102 may compare the current location of the sun 322 to the current heading and/or pitch of the vehicle 100 to determine the location of the sun 322 relative to the vehicle 100 (i.e., whether the sun is 5 degrees above the pitch of the vehicle, whether the sun 322 is 10 degrees to the left of the heading of the vehicle or the like). The ECU 102 may then verify the location of the sun 322 relative to the vehicle 100 by comparing the determined location of the sun 322 relative to the vehicle to the location of the sun 322 relative to the vehicle 100 detected by the forward-facing camera 116.

The ECU 102 may compare the location of the sun 322 relative to the vehicle 100 to the location of the driver's eyes (and/or passenger's eyes) relative to the vehicle 100. The ECU 102 may determine a location or area on the windshield 316 that is directly between the sun 322 and the driver's eyes based on this comparison. The ECU 102 may then control some or all of the liquid crystals in the area between the sun 322 and the driver's eyes to switch to the shaded state. This reduces an amount of sunlight that reaches the driver's eyes, providing shade to the driver's eyes from the sun. Stated differently, this prevents direct (i.e., unshaded) sunlight from reaching the driver's eyes.

Figure 4A:
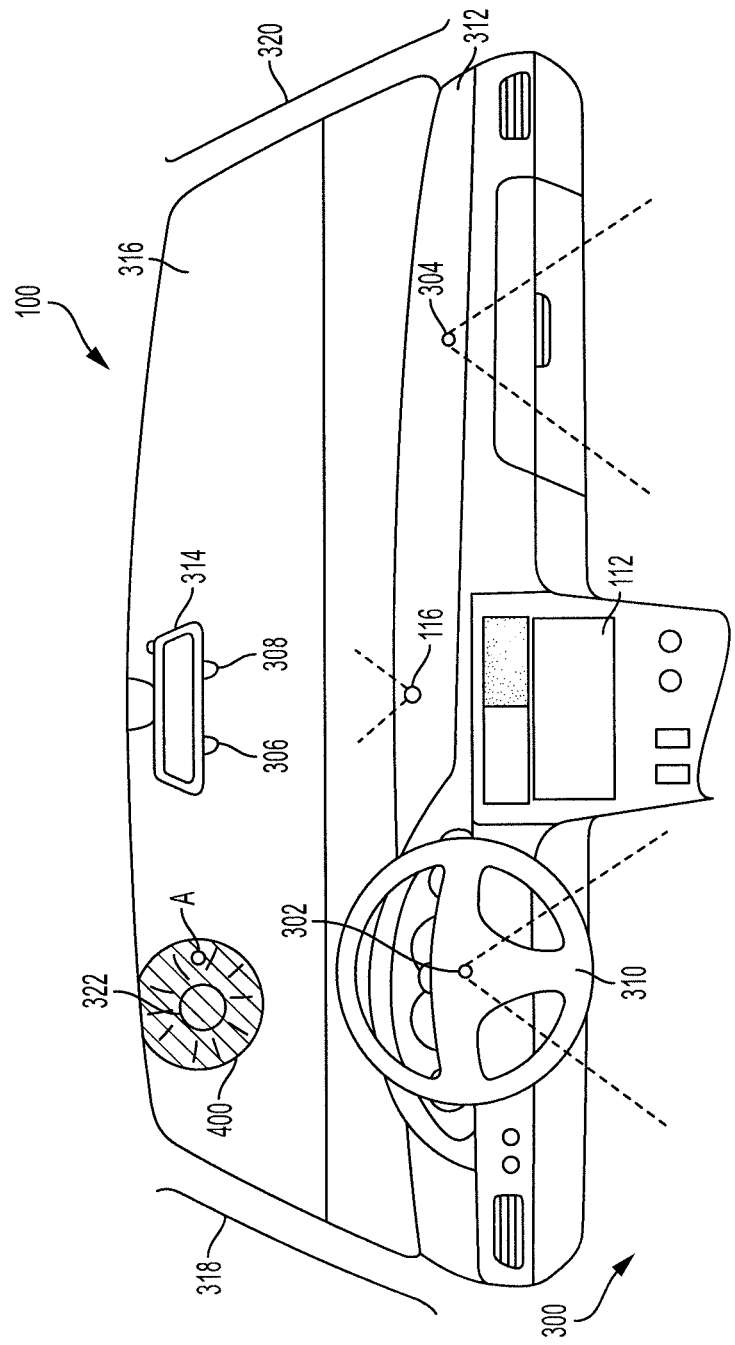
FIG. 4A is a drawing of the cabin of FIG. 3 showing the windshield of FIG. 3 in which at least some liquid crystals in an area between the sun and the driver's eyes are in a shaded state according to an embodiment of the present invention.

Turning now to FIGS. 1 and 4A, the ECU 102 has determined that an area 400 of the windshield 316 is between the sun 322 and the driver's eyes. The ECU 102 has further controlled at least some liquid crystals in the windshield 316 such that the area 400 is shaded.

Figure 4B:
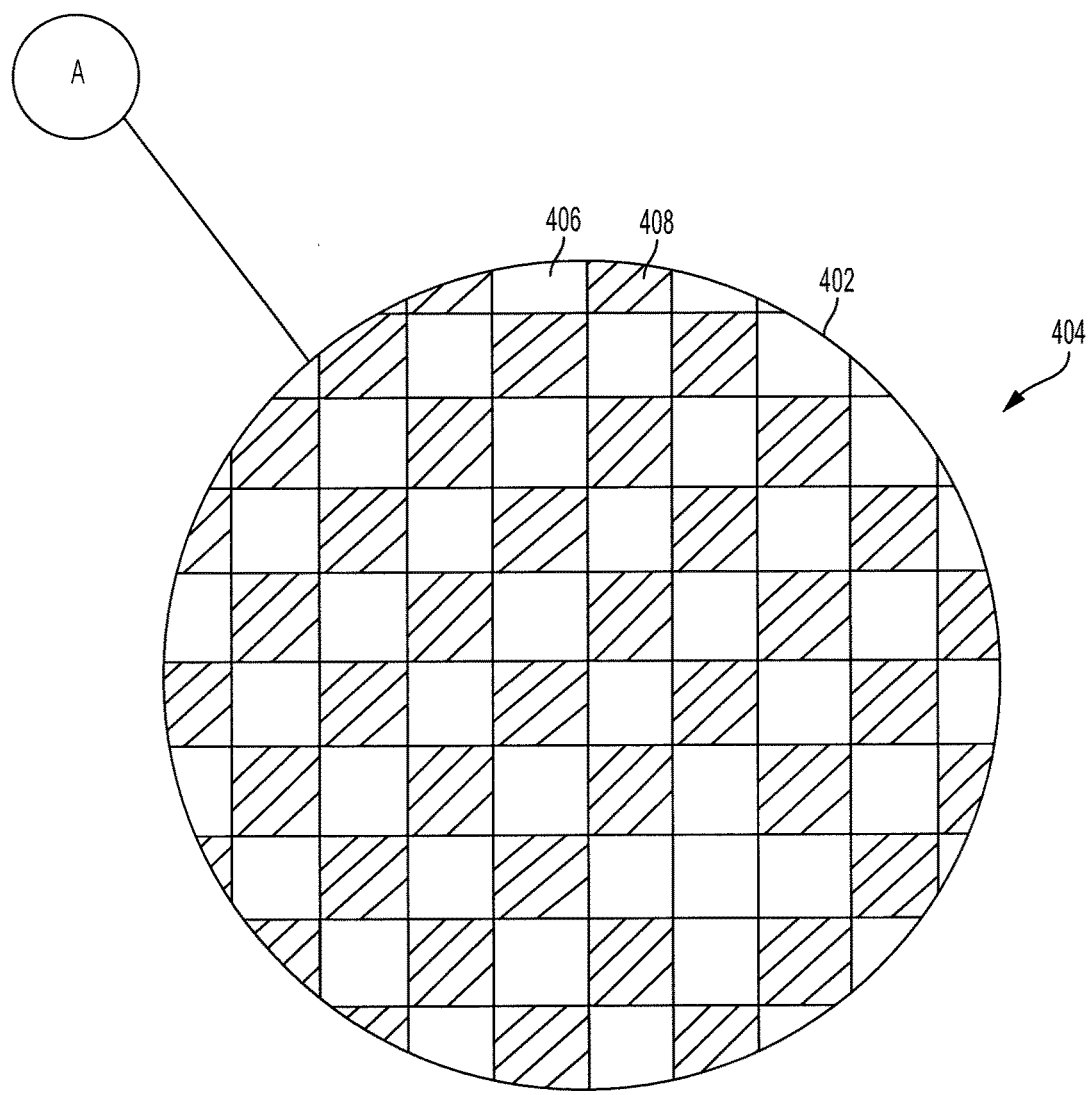
FIG. 4B is a drawing of some liquid crystals of the area of FIG. 4A with some liquid crystals being in the shaded state and some of the liquid crystals being in a transparent state according to an embodiment of the present invention.

Referring to FIGS. 4A and 4B, a portion 402 of the windshield 316 within the area 400 is shown. Within the portion 402 are multiple liquid crystals 404. The liquid crystals 404 may be applied to the windshield 316 in various manners. For example, the liquid crystals 404 may be provided in sheet form and affixed to the glass of the windshield 316 via a bonding process. Bonding of the sheet to the glass may occur before or after installation of the glass onto the vehicle 100. In some embodiments, the liquid crystals 404 may be inserted or coupled to the glass during manufacture of the windshield 316. For example, two sheets of glass may be manufactured, the liquid crystals may be placed between the two sheets of glass then the sheets of glass and/or liquid crystals may be coupled and/or bonded together to form the windshield 316.

At least some of the liquid crystals 404 in the area 400 are to be switched to the shaded state in order to shade the driver's eyes from the sun. As shown in FIG. 4B, some of the liquid crystals 404 are in the transparent state 406 and some of the liquid crystals 404 are in the shaded state 408. It may be undesirable for each of the liquid crystals 404 in the area 400 to be in the shaded state as this may affect the driver's visibility (i.e., the liquid crystals 404 may prevent the driver from seeing through the area 400 of the windshield 316). However, because only some of the liquid crystals 404 are in the shaded state 408, the driver has visibility through the area 400.

The ratio of shaded liquid crystals 408 to transparent liquid crystals 406 may be predetermined based on a desired visibility and a desired amount of shade. For example, if more shading of the sun is desired, more liquid crystals 404 may be in the shaded state 408 than if higher visibility is desired. In some embodiments, the driver may use the input device 112 to select an amount of shade or visibility desired. The ECU 102 of FIG. 1 will adjust the ratio of shaded liquid crystals 408 to transparent liquid crystals 406 based on this input.

Figure 5:
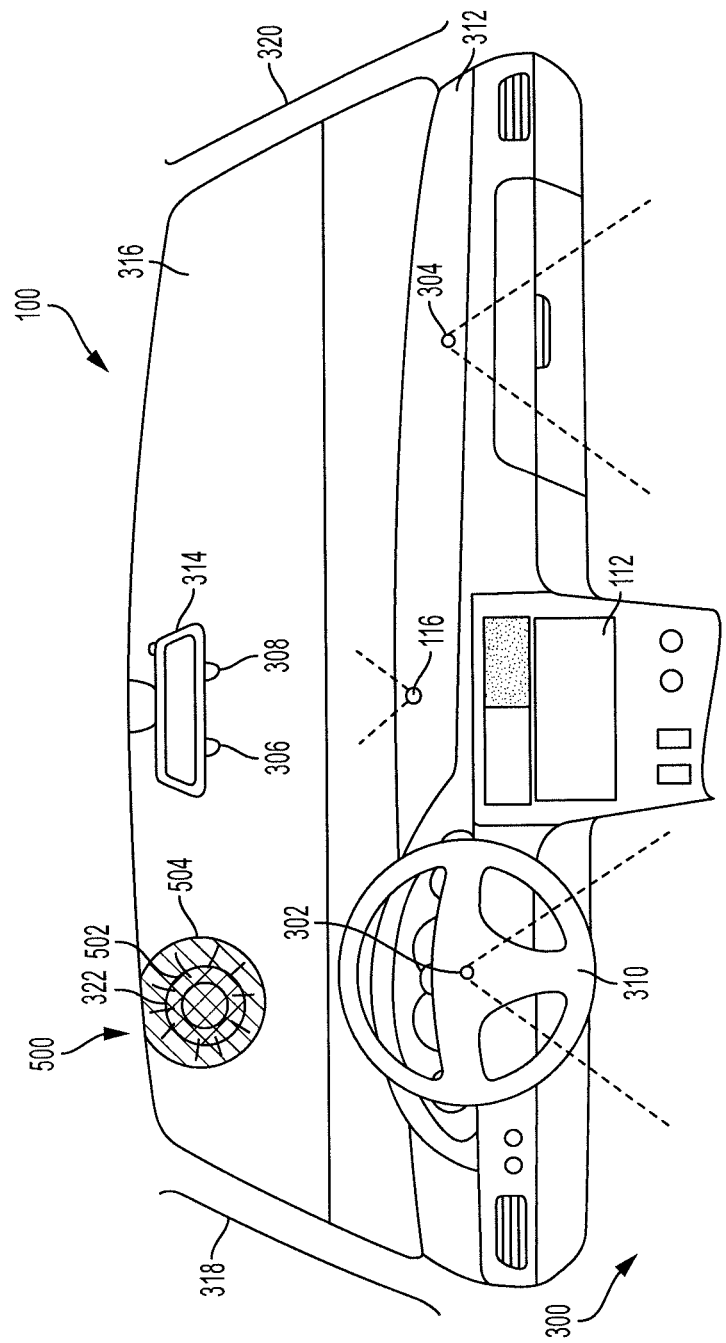
FIG. 5 is another drawing of the cabin of FIG. 3 with a first area of the windshield between the sun and the driver's eyes that has a dark shading and a second area extending outward from the first area that has lighter shading according to an embodiment of the present invention.

In some embodiments, more than one amount of shading or visibility may be provided. Turning to FIG. 5, an area 500 of the windshield 316 has a first portion 502 having a first amount of shading and a second portion 504 having a second amount of shading that is less than the first amount of shading. For example, the first portion 502 may be directly between the sun 322 and the driver's eyes and the second portion 504 may extend away from the first portion 502. The first portion 502 provides direct shading for the driver's eyes and the second portion 504 provides shade for the driver's eyes in case the driver quickly changes the position of his head. The second portion 504 further reduces an amount of indirect sunlight that may reach the driver's eyes.

Referring again to FIGS. 4A and 4B, in some embodiments, the liquid crystals 404 may have a partially shaded state in which they are partially transparent such that some, but not all, light may pass therethrough. In these embodiments, each of the liquid crystals 404 may be partially shaded. In that regard, the driver may see through the shaded liquid crystals. In some embodiments, the liquid crystals 404 may have more than one shaded state. For example, the liquid crystals 404 may have a partially shaded state and a fully shaded state in which no light, or less light than the partially shaded state, may pass therethrough.

In some embodiments, some or all of the windows of the vehicle 100 may include liquid crystals and be capable of providing shade. In some embodiments shade may be provided to any passenger of the vehicle in any location of the vehicle.

Figure 6:
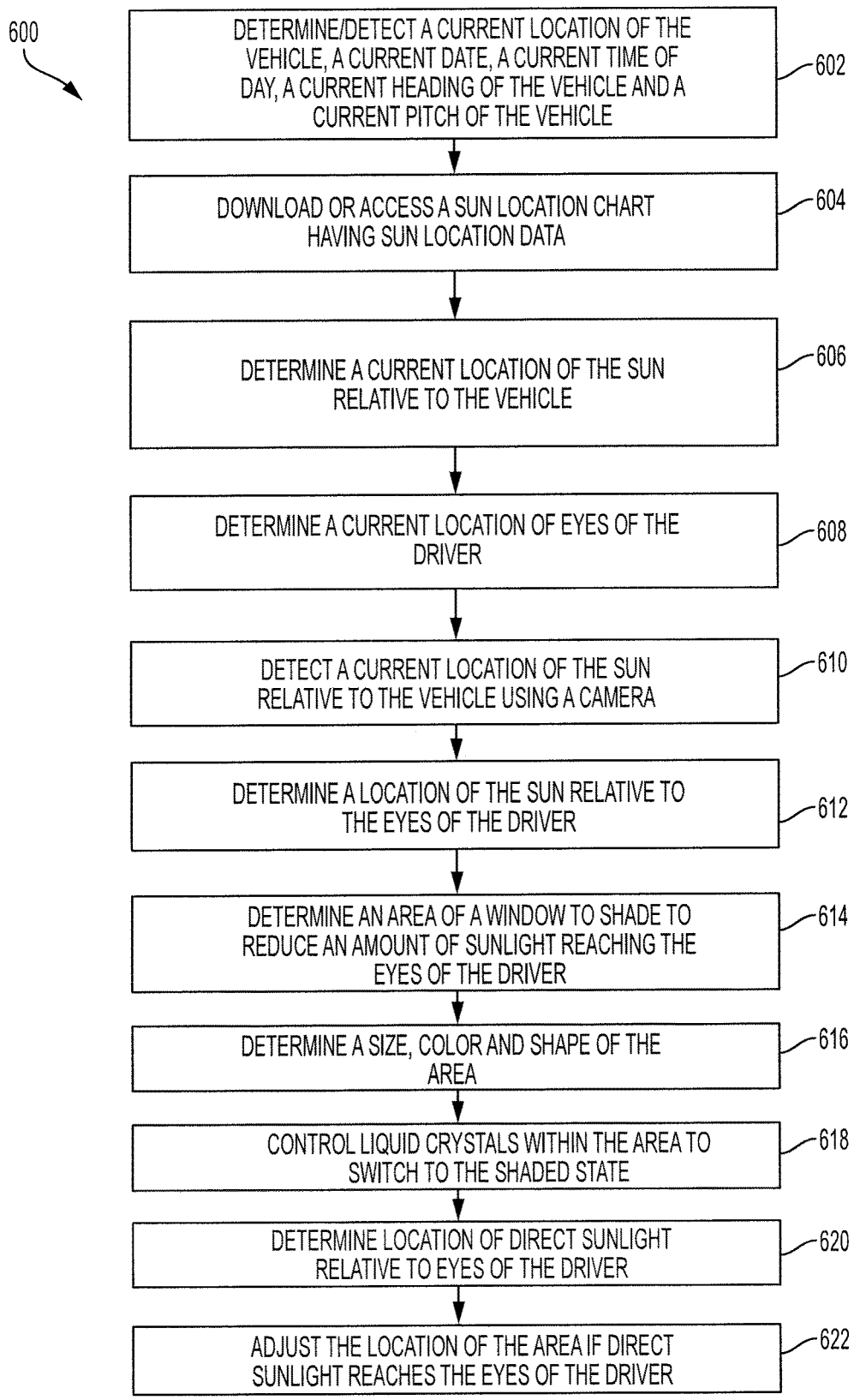
FIG. 6 is a flowchart illustrating a method for providing shade on a vehicle window using liquid crystals between the sun and driver's eyes according to an embodiment of the present invention.

Turning now to FIG. 6, a method 600 for providing shade for a driver of a vehicle is shown. The method 600 may be performed by components of a vehicle such as the vehicle 100 of FIG. 1.

The method 600 begins at block 602 where an ECU may determine a current location of the vehicle, a current date, a current time of day, a current heading of the vehicle and a current pitch of the vehicle. This data may be determined based on data received from components such as a GPS unit, a clock, an IMU or the like.

Figure 7:
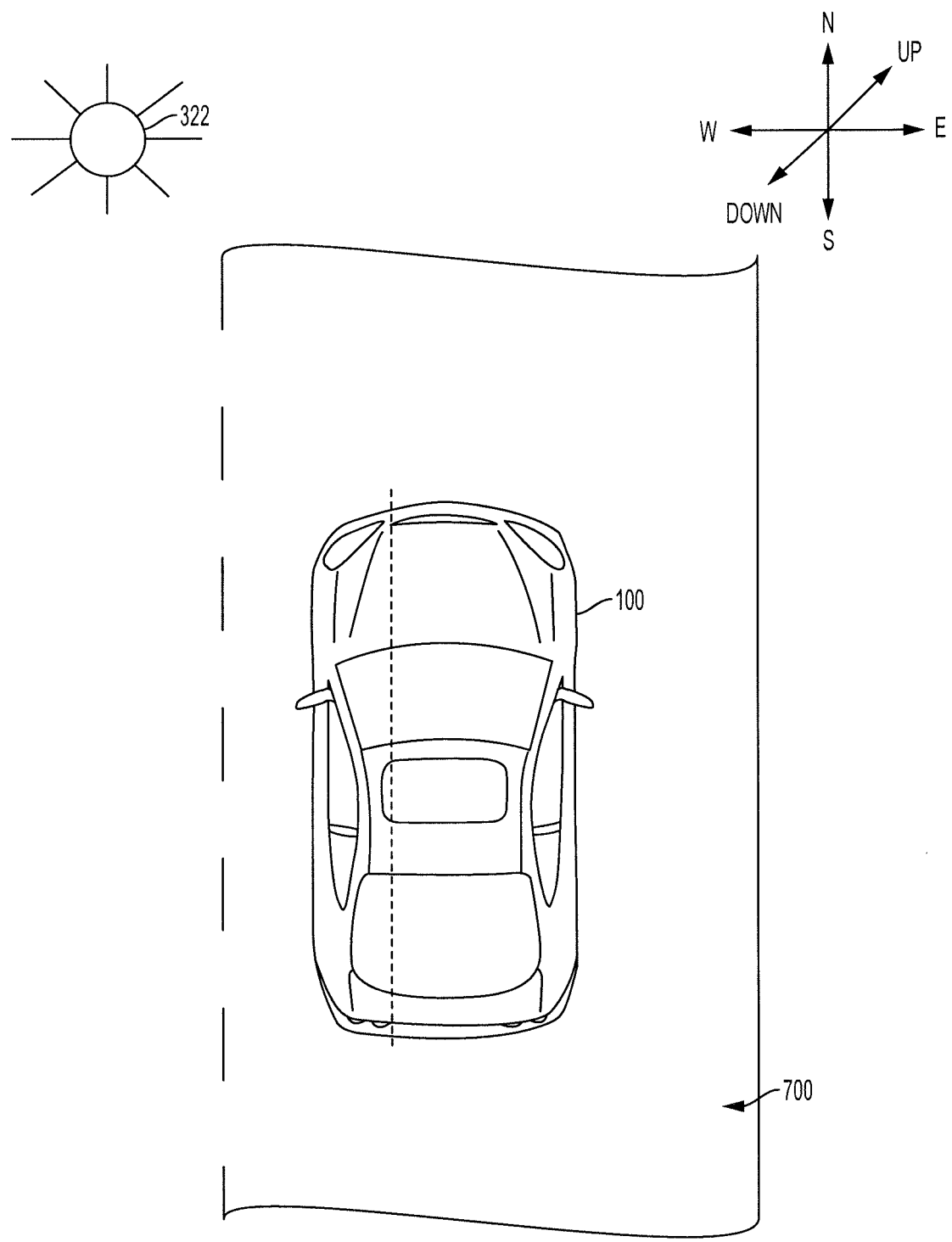
FIG. 7 is a drawing showing a top-down view of the sun and the vehicle of FIG. 1 on a road along with axes for illustrating a heading of the vehicle according to an embodiment of the present invention.

Turning to FIG. 7, a top-down view of the vehicle 100 on a road 700 is shown along with axes showing the North, South, East, West, up and down directions. Where used herein, a heading refers to a direction along the North, South, East, West plane, and combinations thereof. For example, the heading of the vehicle 100 may be referred to as 0 degrees because the vehicle 100 is heading directly north.

Figure 8:
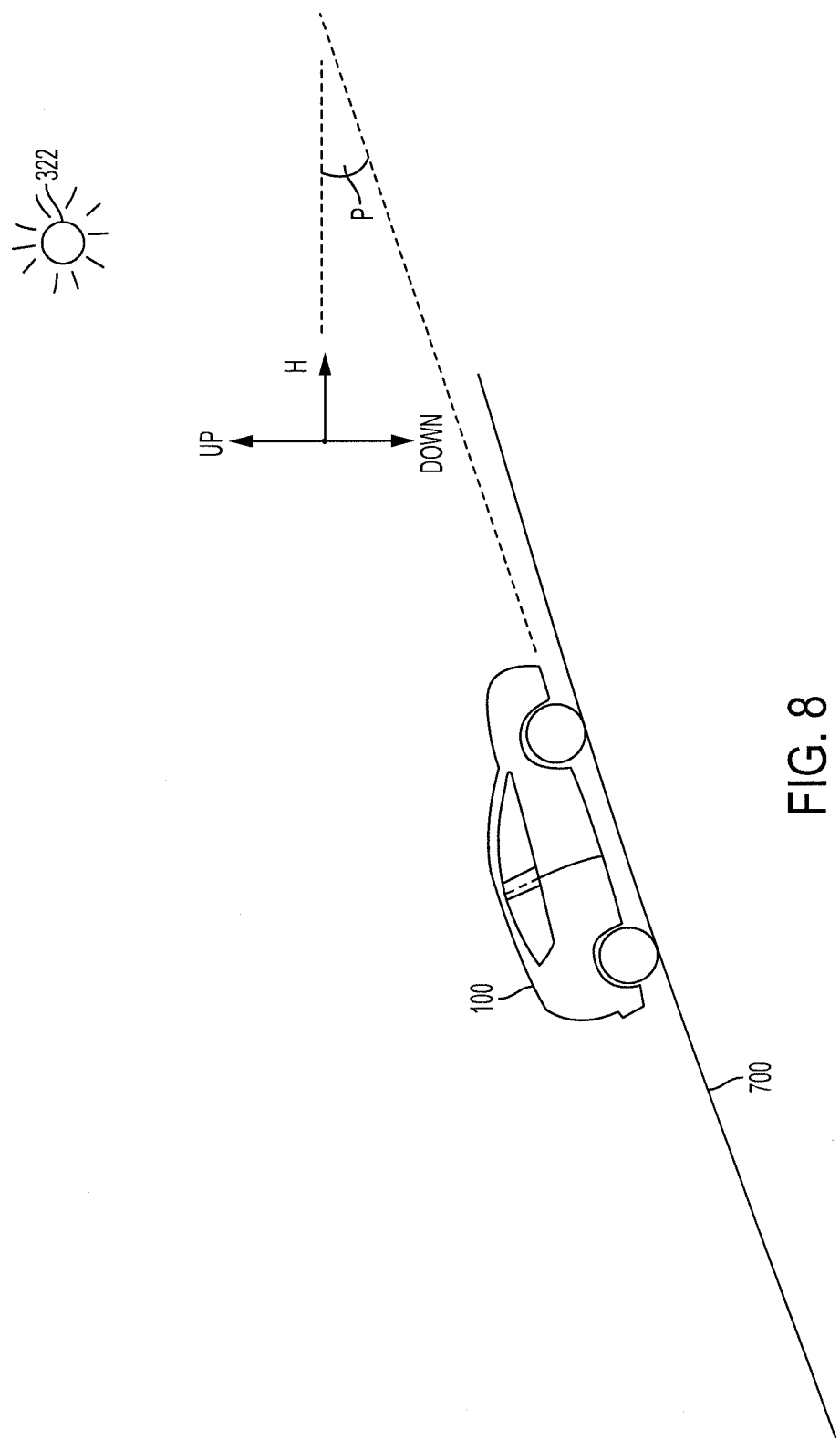
FIG. 8 is a drawing showing a side view of the vehicle of FIG. 1 on a road and the sun along with axes for illustrating a pitch of the vehicle according to an embodiment of the present invention.

Turning to FIG. 8, a side view of the vehicle 100 on the road 700 is shown along with a horizontal axis and the up and down (vertical) axis. The horizontal axis corresponds to the North, South, East, West plane. As shown, the vehicle 100 is traveling upwards and is not parallel with the horizontal axis. The pitch P of the vehicle 100 relative to the horizon is shown as the difference between the horizontal direction and the direction of travel of the vehicle along the up and down axis.

Returning to FIG. 6, in block 604, the ECU downloads or accesses a sun location chart that includes sun location data. The sun location chart may be stored in a memory of the vehicle or may be stored in the cloud. If the sun location chart is stored in the cloud, the ECU may download a portion of, or the entire, sun location chart or may access a portion of, or the entire, sun location chart. The sun location chart may have similar data as the sun location chart 200 shown in FIG. 2.

In block 606, the ECU may determine a current location of the sun relative to the vehicle. The ECU may determine the relative location of the sun based on the current location of the vehicle, the current time of day, the current heading of the vehicle, the current pitch of the vehicle and the sun location data from the sun location chart. The current location of the sun may be provided as having a direction and an angle relative to the horizon. The ECU may determine the location of the sun relative to the vehicle by comparing the current location of the sun to the current heading of the vehicle and the current pitch of the vehicle.

For example and referring again to FIGS. 7 and 8, the vehicle 100 has a current heading of directly north, or 0 degrees, or 360 degrees. The vehicle 100 has a current pitch P of about 25 degrees. The sun is positioned in a northwest location in the sky such as, for example, 315 degrees and is about 45 degrees above the horizon. The ECU may determine that the current location of the sun 322 relative to the vehicle 100 is 45 degrees to the left of the current heading of the vehicle 100 (360 degrees minus 315 degrees) and 20 degrees above the current pitch of the vehicle 100 (45 degrees minus 25 degrees).

Returning to FIG. 6, after the ECU determines the current location of the sun relative to the vehicle, the ECU may determine a current location of eyes of the driver. The ECU may determine the current location of the eyes of the driver based on the detected image data from a driver-facing camera. The driver-facing camera may be at a fixed location within the vehicle. Thus, the ECU can determine the location of the driver's eyes relative to the vehicle due to the fixed nature of the driver-facing camera.

In block 610, the ECU may detect the current location of the sun relative to the vehicle using a forward-facing camera. Because the forward-facing camera is at a fixed location on or in to the vehicle, the ECU can determine the location of the sun relative to the vehicle based on the image data from the forward-facing camera.

In block 612, the ECU may determine a location of the sun relative to the eyes of the driver. Because the ECU is aware of the location of the eyes of the driver relative to the vehicle and aware of the location of the sun relative to the vehicle, the ECU can determine the location of the sun relative to the eyes of the driver. The ECU may determine the location of the sun relative to the eyes of the driver based on at least one of the determined location of the sun relative to the vehicle or the detected location of the sun relative to the vehicle.

In some embodiments, the ECU may first compare the determined location of the sun relative to the vehicle and the detected location of the sun relative to the vehicle. If the detected and determined locations of the sun relative to the vehicle are the same, the method 600 may proceed using that value. However, if the values are different, the ECU may select one of the determined or the detected current location of the sun relative to the vehicle and the method 600 may proceed with that value. In some embodiments, one of the detected or determined location of the sun relative to the vehicle may be given priority over the other.

In some embodiments, the ECU may determine which data is more likely to be accurate. For example, the ECU may determine whether one or more components is faulty and select the determined or the detected current location of the sun relative to the vehicle based on the faulty component. For example, if the IMU is faulty, the determined location of the sun relative to the vehicle may be inaccurate because the detected heading or pitch of the vehicle may be inaccurate. Thus, in this situation, the ECU may proceed with the method 600 using the detected current location of the sun relative to the vehicle. As another example, if the ECU determines that the forward-facing camera is faulty, the ECU may proceed with the method 600 using the determined current location of the sun relative to the vehicle.

In block 622 (discussed in further detail below), the ECU adjusts the location of the area of shade if direct sunlight reaches the eyes of the driver. This may include selecting the other of the determined or detect current location of the sun relative to the vehicle if the values did not match in block 612.

After determining the location of the sun relative to the eyes of the driver, the ECU may select or determine an area of one or more vehicle window to shade to reduce an amount of sunlight that reaches the eyes of the driver in block 614. The ECU may select the area to be directly between the eyes of the driver and the sun. In that regard, when the area is shaded, direct sunlight is prevented from reaching the eyes of the driver. In some embodiments, the ECU may determine a point or an area on the vehicle window that is between the eyes of the driver and the sun. In that regard, the area will be selected based on the size, color and shape determined in block 616.

In block 616, the ECU may determine a size, color and shape of the area. For example, the ECU may determine the size, color, shape and shading of the area based on user input. In some embodiments, the user may be able to select a desired amount of shade (i.e., corresponding to a ratio of shaded to transparent liquid crystals in the area).

In some embodiments, the area is not customizable and is predetermined by the ECU. For example, the area may be a shape having predetermined dimensions such as a circle having a 3 inch radius. For example, a center of the circle may be positioned directly between the driver's eyes and the sun and the circle may extend for 3 inches in each direction. If a location on the windshield is not directly between the driver's eyes and the sun then the area may still be present on the windshield. For example, if the location directly between the driver's eyes and the sun is one inch above the top of the windshield, the area may extend for 2 inches below the top of the windshield.

In block 618, the ECU may control some or all of the liquid crystals within the selected area to switch to the shaded state. Each of the liquid crystals may have one or more shaded states. For example, a liquid crystal may have a partially shaded state and a fully shaded state. Furthermore, each liquid crystal may have multiple shaded states that correspond to different colors or darkness. For example, a liquid crystal may have a red shaded state, a blue shaded state, a green shaded state or the like. When the ECU controls the liquid crystals within the area to switch to the shaded state, the ECU may control each of the liquid crystals to switch to the same shaded state or a different shaded state. For example, the user may select for the area to resemble a rainbow. In that regard, the ECU would control some of the liquid crystals to be in the blue shaded state, some to be in the red shaded state and the like.

In block 620, the ECU may determine the location of sunlight relative to eyes of the driver. The driver-facing camera may detect image data corresponding to the driver's eyes and the location of the direct sunlight. The ECU may determine the location of the sunlight relative to the eyes of the driver based on the detected image data from the driver-facing camera.

Figure 9A:
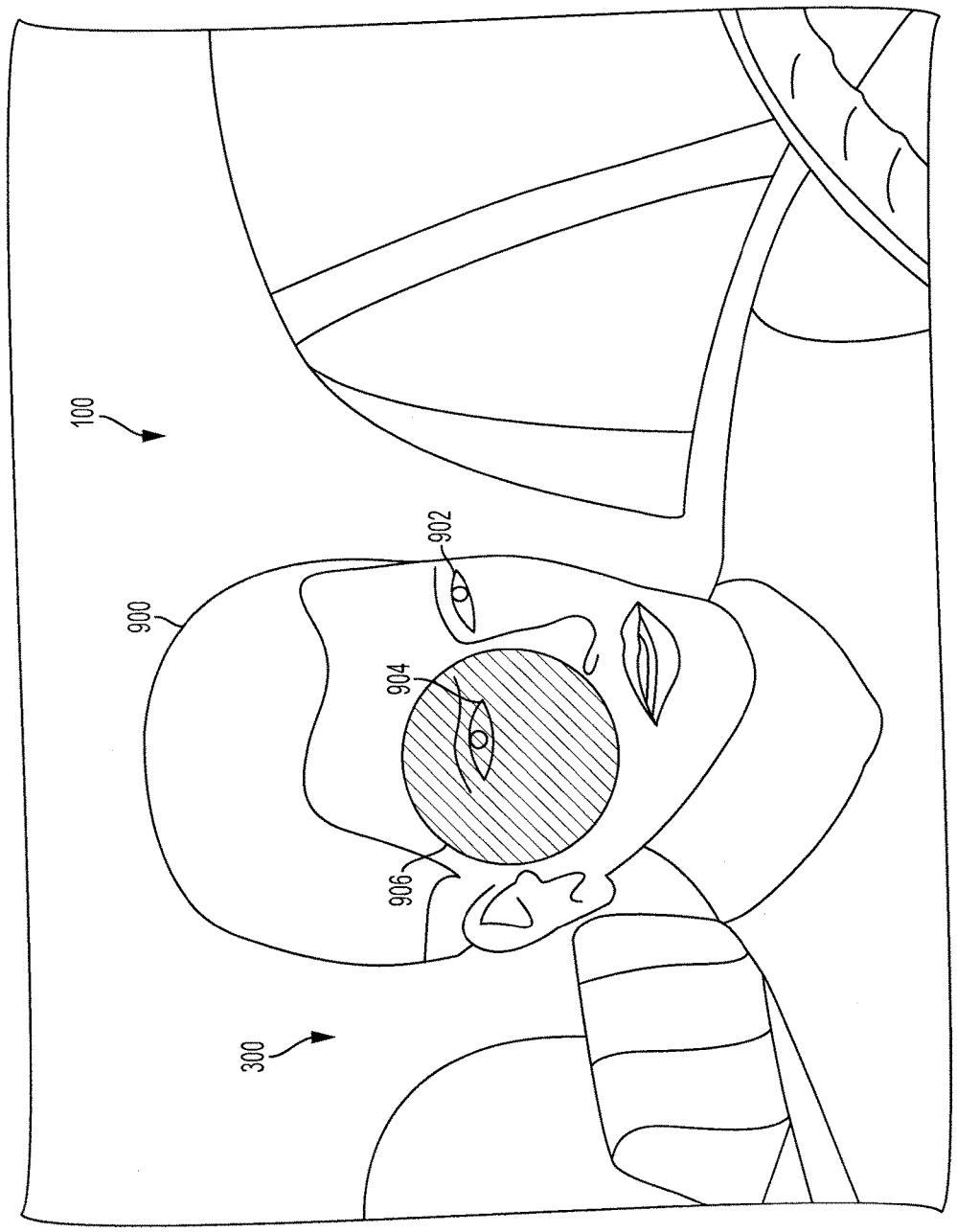
FIG. 9A is a drawing of a driver's face in a cabin of the vehicle of FIG. 1 along with an area of shade on the driver's face according to an embodiment of the present invention.

Turning briefly to FIG. 9A, exemplary image data detected by a driver-facing camera is shown. A driver 900 is in the cabin 300 of the vehicle 100. An area of the driver's face 906 including his right eye 904 is shaded while direct sunlight is reaching the rest of the driver's face including his left eye 902.

Returning to FIG. 6, in block 622, the ECU may adjust the location of the area if the direct sunlight is reaching one or both eyes of the driver. The ECU may adjust the location of the area based on the detected image data. In some embodiments, the ECU may perform some or all of the steps of the method 600 of FIG. 6 in order to change the location of the area.

Figure 9B:
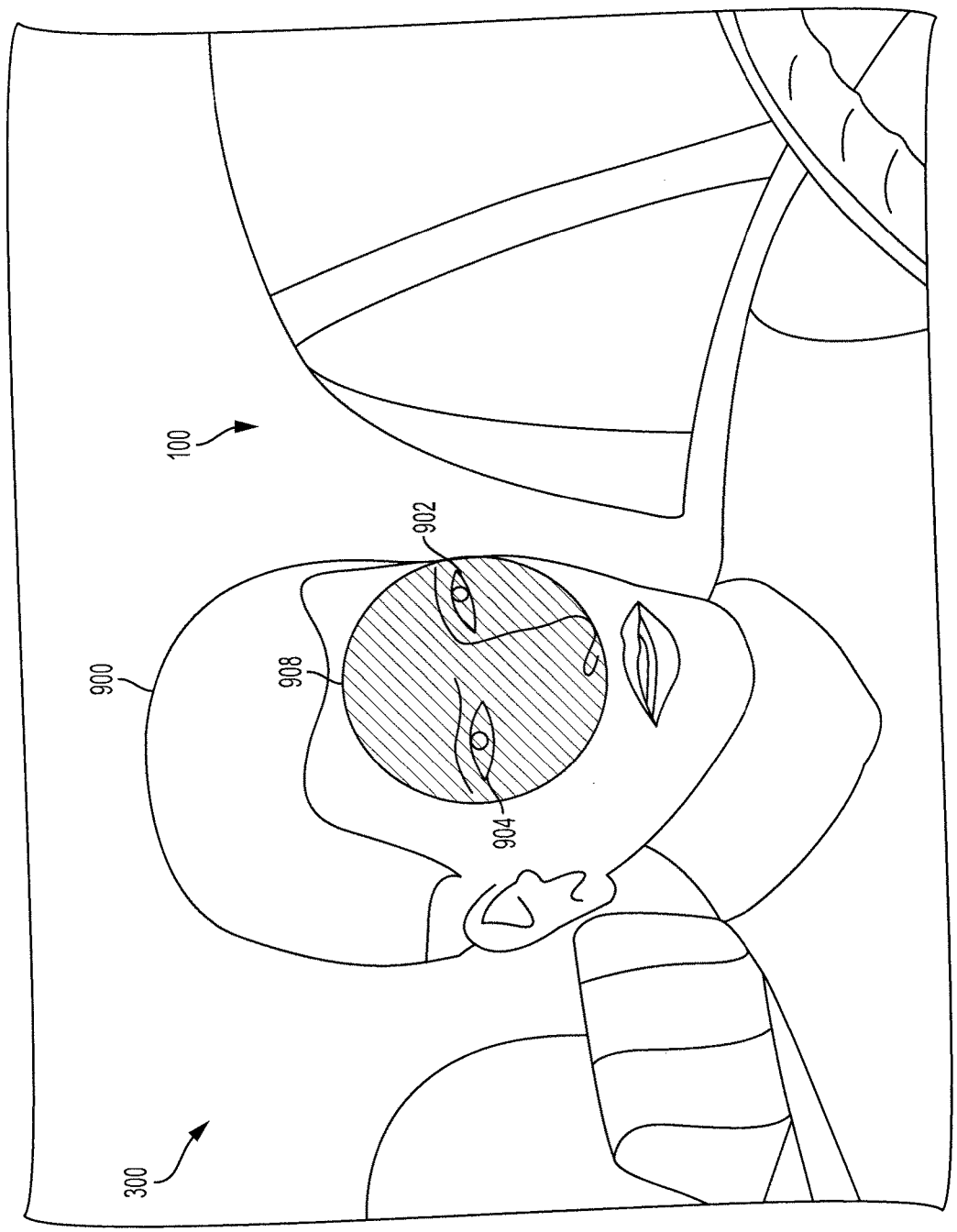
FIG. 9B is a drawing of the driver's face of FIG. 9A with the area of shade moved to shade both of the driver's eyes according to an embodiment of the present invention.

In some embodiments, the ECU may adjust the area of to be shaded based on the detected image data from the driver-facing camera. For example and referring to FIGS. 9A and 9B, the ECU may determine that the area of shade should be moved from its location in FIG. 9A to provide shade at a new area of the driver's face 908 that is to the left of the original shaded area of the driver's face 906.

Thus and with brief reference to FIG. 6, the ECU may control the windshield of the vehicle to continuously provide shade between the sun and the driver's eyes using the method 600. In some embodiments, the ECU may perform the method 600 to provide shade for a driver's face, head, entire body or any exposed skin. In that regard, the method 600 may be performed using the same blocks with the driver's face, head, entire body or exposed skin in place of the driver's eyes. For example, the ECU may determine a current location of a face, head, entire body or exposed skin of a driver in block 608, may determine a location of the sun relative to the face, head, entire body or exposed skin of the driver, determine an area of a window to shade to reduce an amount of sunlight reaching the face, head, entire body or exposed skin of the driver and the like. In some embodiments, the user can select, using an input device, the desired body part(s) to be shaded and in some embodiments this data is predetermined by the ECU. In some embodiments, the ECU can determine the body part(s) to shade based on a location and time of year of the vehicle. For example, if the vehicle is in Canada, shading of the driver's skin may not be as important as if the vehicle is in a tropical region as the sun is weaker in Canada and may not pose as great a risk of causing skin cancer.

Figure 10:
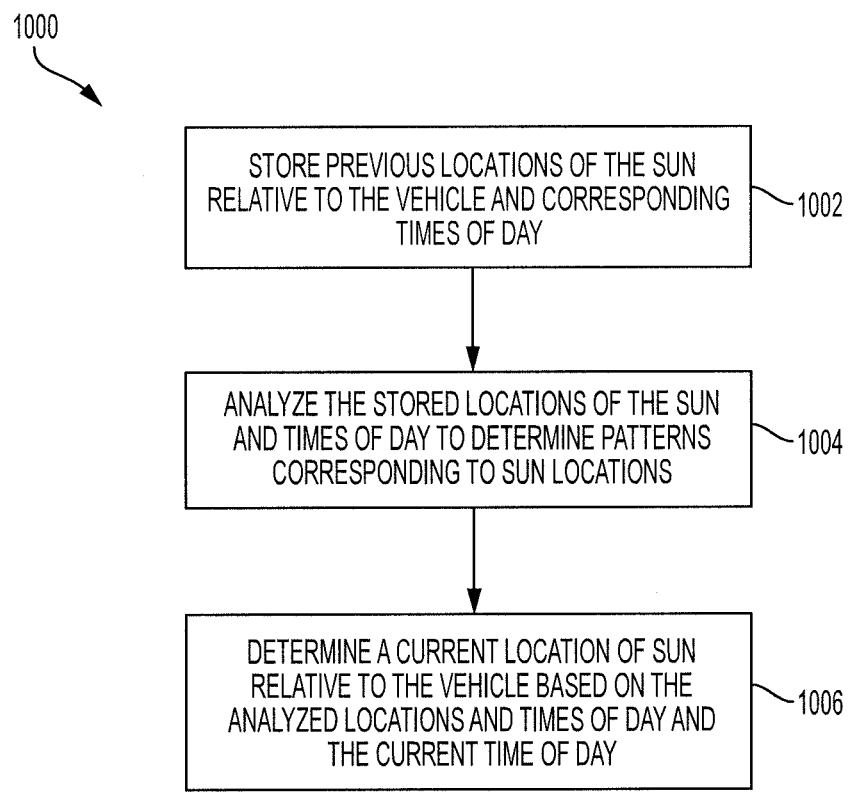
FIG. 10 is a flowchart illustrating a method for determining a location of the sun relative to a vehicle based on machine learning according to an embodiment of the present invention.

In some embodiments, the ECU may use machine learning to determine the location of the sun relative to the vehicle instead of, or in addition to, the steps shown in blocks 602 through 610. For example and with reference to FIG. 10, a method 1000 for determining a location of the sun relative to a vehicle using machine learning begins at block 1002.

In block 1002, the ECU may store previous locations of the sun relative to the vehicle along with corresponding dates and times. This data may be stored based on the detected locations of the sun relative to the vehicle and determined locations of the sun relative to the vehicle.

In block 1004, the ECU may analyze the stored locations of the sun and the corresponding dates and times. Using this information, the ECU can determine patterns corresponding to the locations of the sun at various dates and times of day. For example, the ECU may learn that the location of the sun shifts in a particular direction each day between January and June for a particular location.

After sufficient data and analysis, the ECU will be able to determine a location of the sun relative to the vehicle at a future date and time of day. Thus, in block 1006, the ECU may determine a current location of the sun relative to the vehicle based on the detected data and analysis thereof.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for reducing sunlight shining into a vehicle comprising:
    a window having an array of liquid crystals that can each be switched between a transparent state and a shaded state in which less light can pass therethrough;
    an eye position sensor configured to detect a location of eyes of a driver;
    an inertial measurement unit (IMU) configured to detect a current heading of the vehicle; and
    an electronic control unit (ECU) coupled to the array of liquid crystals, the eye position sensor and the IMU and configured to determine a current location of the sun relative to the vehicle based on the current heading of the vehicle and a current time of day, to select an area of the window to be shaded in order to reduce an amount of sunlight reaching the eyes of the driver based on the location of the eyes of the driver and the current location of the sun relative to the vehicle, and to control liquid crystals within the selected area of the window to switch from the transparent state to the shaded state.

2. The system of claim 1 further comprising a forward-facing camera coupled to the ECU and configured to detect a current location of the sun relative to the vehicle and wherein the eye position sensor is a driver-facing camera configured to detect driver image data corresponding to the eyes of the driver and the ECU is further configured to:
    compare the detected current location of the sun relative to the vehicle to the determined current location of the sun relative to the vehicle,
    determine whether the liquid crystals in the shaded state are reducing the amount of sunlight reaching the eyes of the driver based on the driver image data, and select a new area of the window to be shaded based on at least one of the detected current location of the sun relative to the vehicle or the driver image data when the detected driver image data indicates that direct sunlight is reaching the eyes of the driver.

3. The system of claim 1 wherein the eye position sensor is a driver-facing camera and is further configured to determine whether direct sunlight is reaching the eyes of the driver and wherein the ECU is further configured to select a new area of the window to be shaded when direct sunlight is reaching the eyes of the driver.

4. The system of claim 1 further comprising a sunlight sensor coupled to the ECU and configured to detect an amount of ambient light and wherein the ECU is further configured to control the array of liquid crystals to each be in the transparent state when the detected amount of ambient light is less than or equal to an ambient light threshold.

5. The system of claim 1 wherein the ECU is further configured to determine whether a fault has occurred in the eye position sensor or the IMU and to control the array of liquid crystals to each be in the transparent state when the ECU determines that the fault has occurred in the eye position sensor or the IMU.

6. The system of claim 1 wherein the ECU is further configured to cause a first percentage of pixels in a center of the selected area of the window to switch from the transparent state to the shaded state and to cause a second percentage of pixels in the remaining area of the selected area of the window to switch from the transparent state to the shaded state, the second percentage of pixels being less than the first percentage of pixels.

7. The system of claim 1 further comprising:
a global positioning system (GPS) unit coupled to the ECU and configured to detect a current location of the vehicle; and
a network access device coupled to the ECU and configured to communicate with a cloud,
wherein the ECU is further configured to instruct the network access device to transmit the current location of the vehicle to the cloud, to receive sun location data from the cloud via the network access device and to further determine the current location of the sun relative to the vehicle based on the received sun location data.

8. The system of claim 1 further comprising a memory and wherein the ECU is further configured to store a previously-determined location of the sun in the memory and to determine the current location of the sun relative to the vehicle based on the previously-determined location of the sun.

9. The system of claim 1 wherein the IMU is further configured to determine a pitch of the vehicle relative to a current horizon and wherein the ECU is further configured to determine the current location of the sun relative to the vehicle based on the pitch of the vehicle relative to the current horizon.

10. The system of claim 1 further comprising an input device configured to receive user input corresponding to at least one of a desired shade shape or a desired shade color and wherein the ECU is further configured to cause the selected area of the window to have the at least one of the desired shade shape or the desired shade color.

11. The system of claim 1 wherein the eye position sensor is a driver-facing camera and is further configured to determine a current location of an entire face of the driver and wherein the selected area of the window to be shaded is sufficiently large to reduce another amount of sunlight that can reach the entire face of the driver.

12. The system of claim 1 wherein the ECU is further configured to determine a current route of the vehicle and to determine a future location of the sun relative to the vehicle based on a future location of the vehicle along the current route.

13. The system of claim 1 wherein the ECU is further configured to continuously or periodically select a new area of the window to be shaded based on a new current location of the sun relative to the vehicle and a new current heading of the vehicle and to control liquid crystals within the new selected area of the window to switch from the transparent state to the shaded state.

14. The system of claim 1 further comprising a passenger eye position sensor configured to detect a location of eyes of a passenger and wherein the ECU is further configured to select a second area of the window to be shaded in order to reduce another amount of sunlight reaching the eyes of the passenger based on the location of the eyes of the passenger and the location of the sun relative to the vehicle, and to control liquid crystals within the second selected area of the window to switch from the transparent state to the shaded state.

15. A system for reducing sunlight shining into a vehicle comprising:
a window having an array of liquid crystals that can each be switched between a transparent state and a shaded state in which less light can pass therethrough;
a driver-facing camera configured to detect a current location of exposed skin of a driver;
a sun position sensor configured to detect a current location of the sun relative to the vehicle; and
an electronic control unit (ECU) coupled to the array of liquid crystals, the driver-facing camera and the sun position sensor and configured to select at least one area of the window to be shaded in order to reduce an amount of sunlight reaching the exposed skin of the driver based on the current location of the exposed skin and the detected current location of the sun relative to the vehicle, and to control liquid crystals within the at least one selected area of the window to switch from the transparent state to the shaded state.

16. The system of claim 15 wherein the ECU is further configured to control a percentage of the liquid crystals within the at least one selected area of the window to switch from the transparent state to the shaded state such that some light can pass through the at least one selected area of the window.

17. The system of claim 15 further comprising an inertial measurement unit (IMU) coupled to the ECU and configured to detect a current heading of the vehicle and wherein the ECU is further configured to determine a current location of the sun relative to the vehicle based on the current heading of the vehicle and to select the at least one area of the window further based on the determined current location of the sun relative to the vehicle.

18. A method for reducing sunlight shining into a vehicle comprising:
detecting, by an eye position sensor, a location of eyes of a driver;
detecting, by an inertial measurement unit (IMU), a current heading of the vehicle;
determining, by an electronic control unit (ECU), a current location of the sun relative to the vehicle based on the current heading of the vehicle and a current time of day;

selecting, by the ECU, an area of a window of the vehicle to be shaded in order to reduce an amount of sunlight reaching the eyes of the driver based on the location of the eyes of the driver and the current location of the sun relative to the vehicle; and controlling, by the ECU, liquid crystals within the selected area of the window to switch from a transparent state to a shaded state in which less light can pass therethrough.

19. The method of claim 18 further comprising:

detecting, by a global positioning system (GPS) unit, a current location of the vehicle;

transmitting, by a network access device, the current location of the vehicle to a cloud; and receiving, by the network access device, a current location of the sun in the sky, wherein determining the current location of the sun relative to the vehicle includes comparing the current heading of the vehicle to the current location of the sun in the sky.

20. The method of claim 18 further comprising storing, in a memory, a previous location of the sun relative to the vehicle and a corresponding previous current time of day and wherein determining the current location of the sun relative to the vehicle includes analyzing the previous location of the sun relative to the vehicle and the corresponding previous current time of day.

* * * * *